(12) United States Patent
Yang et al.

(10) Patent No.: US 11,348,207 B2
(45) Date of Patent: May 31, 2022

(54) IMAGE PROCESSING METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventors: Yang Yang, Shenzhen (CN); Wenye Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 109 days.

(21) Appl. No.: 16/921,813

(22) Filed: Jul. 6, 2020

(65) Prior Publication Data

US 2020/0334794 A1 Oct. 22, 2020

Related U.S. Application Data

(63) Continuation of application No. PCT/CN2019/088973, filed on May 29, 2019.

(30) Foreign Application Priority Data

Jun. 29, 2018 (CN) .......................... 201810693249.3

(51) Int. Cl.
*G06T 5/00* (2006.01)
*G06T 5/10* (2006.01)

(52) U.S. Cl.
CPC ................ *G06T 5/003* (2013.01); *G06T 5/10* (2013.01); *G06T 2207/10024* (2013.01); *G06T 2207/20052* (2013.01)

(58) Field of Classification Search
CPC . G06T 5/003; G06T 5/10; G06T 2207/10024; G06T 2207/20052;

(Continued)

(56) References Cited

U.S. PATENT DOCUMENTS 8,891,896 B2 * 11/2014 Banner ................. G06T 7/0002
382/255
2008/0025627 A1 * 1/2008 Freeman ............ H04N 5/23248
382/255

(Continued)

FOREIGN PATENT DOCUMENTS

AU 2016225778 A 5/2017
CN 103247036 A 8/2013

(Continued)

OTHER PUBLICATIONS

Extended European Search Report, EP19824450.1, dated Jul. 23, 2021, 11 pgs.

(Continued)

*Primary Examiner* — Phuoc Tran
(74) *Attorney, Agent, or Firm* — Morgan, Lewis & Bockius LLP (57) ABSTRACT

Embodiments of this application provide an image processing method performed at a computing device. The image processing method includes: obtaining a to-be-processed image with ghost reflection; calculating an image gradient of the to-be-processed image; determining, according to the image gradient, a gradient of a target image obtained after the ghost reflection is removed from the to-be-processed image; and generating the target image based on the gradient of the target image. According to the technical solution of the embodiments of this application, the ghost reflection in the image can be effectively removed, ensuring high quality of a processed image.

20 Claims, 7 Drawing Sheets

(58) Field of Classification Search
CPC .......... G06T 5/005; G06T 2207/10004; H04N 5/217; H04N 5/23229
See application file for complete search history.

(56) References Cited

U.S. PATENT DOCUMENTS

| | | | |
|---|---|---|---|
| 2013/0058588 A1* | 3/2013 | Wang | G06T 5/003 382/255 |
| 2014/0023291 A1* | 1/2014 | Lin | G06T 5/003 382/279 |
| 2015/0304632 A1 | 10/2015 | Inoue et al. | |
| 2018/0158174 A1 | 6/2018 | Son et al. | |
| 2019/0139199 A1* | 5/2019 | Wang | G06T 5/20 |

FOREIGN PATENT DOCUMENTS

| | | |
|---|---|---|
| CN | 105959543 A | 9/2016 |
| CN | 106650794 A | 5/2017 |
| CN | 106651798 A | 5/2017 |
| CN | 106683052 A | 5/2017 |
| CN | 107610059 A | 1/2018 |
| JP | 2011029710 A | 2/2011 |
| JP | 2017157043 A | 9/2017 |
| WO | WO 2018092540 A1 | 5/2018 |

OTHER PUBLICATIONS

Byeong-Ju Han et al., "Reflection Removal Using Low-Rank Matrix Completion", 2017 IEEE Conference on Computer Vision and Pattern Recognition (CVPR), IEEE Comp. Soc., US, Jul. 21, 2017, pp. 3872-3880, XP033249738.

YiChang Shih et al., "Reflection Removal Using Ghosting Cues", 2015 IEEE Conference on Computer Vision and Pattern Recognition (CVPR), Jun. 7, 2015, XP032793768, 9 pgs.

Li et al. "Exploiting Reflection Change for Automatic Reflection Removal," 2013 IEEE International Conference on Computer Vision, Dec. 31, 2013, 8 pgs.

Tencent Technology, ISR, PCT/CN2019/088973, dated Aug. 22, 2019, 3 pgs.

Tencent Technology, WO, PCT/CN2019/088973, dated Aug. 22, 2019, 4 pgs.

Tencent Technology, IPRP, PCT/CN2019/088973, dated Dec. 29, 2020, 5 pgs.

* cited by examiner

IMAGE PROCESSING METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2019/088973, entitled "IMAGE PROCESSING METHOD, APPARATUS, COMPUTER READABLE MEDIUM, AND ELECTRONIC DEVICE" filed on May 29, 2019, which claims priority to Chinese Patent Application No. 201810693249.3, entitled "IMAGE PROCESSING METHOD AND APPARATUS, COMPUTER-READABLE MEDIUM, AND ELECTRONIC DEVICE" filed Jun. 29, 2018, all of which are incorporated by reference in their entirety.

FIELD OF THE TECHNOLOGY

Embodiments of this application relate to the field of computer technologies, and specifically, to an image processing method and apparatus, a computer-readable medium, and an electronic device.

BACKGROUND OF THE DISCLOSURE

In real life, a plurality of photos are taken through glass (such as windows, store windows, or the like), and the photos taken this way have ghost reflection of a glass surface, which interferes with actually photographed target objects.

For the foregoing problem, the related art proposes to separate and remove the ghost reflection part based on a plurality of similar images (such as a plurality of images taken by slightly changing a shooting angle, using a polarizer, turning on/off a flash, or the like). However, in this solution, a plurality of similar images need to be taken, a special apparatus also needs to be used or a specific condition needs to be met, and therefore it is difficult for the solution to be applicable to real life situations. It can be learned that there is no effective technical solution for removing ghost reflection at present.

Information disclosed in the foregoing background part is only used for enhancing the understanding of the background of the embodiments of this application, and therefore information that does not constitute the related art known to a person skilled in the art may be included.

SUMMARY

An objective of embodiments of this application is to provide an image processing method and apparatus, a computer-readable medium, and an electronic device, to overcome, at least to some extent, a problem that ghost reflection in an image cannot be effectively removed.

Other features and advantages of the embodiments of this application will become apparent through the following detailed description, or partially acquired through practices of the embodiments of this application.

According to an aspect of the embodiments of this application, an image processing method is performed at a computing device having one or more processors and memory storing a plurality of computer programs to be executed by the one or more processors, the method comprising: obtaining a to-be-processed image with ghost reflection; calculating an image gradient of the to-be-processed image; determining, according to the image gradient, a gradient of a target image obtained after the ghost reflection is removed from the to-be-processed image; and generating the target image based on the gradient of the target image.

According to an aspect of the embodiments of this application, a computing device has one or more processors, memory and a plurality of computer programs stored in the memory that, when executed by the one or more processors, cause the computing device to perform the aforementioned image processing method.

According to an aspect of the embodiments of this application, a non-transitory computer-readable medium is provided, storing computer executable instructions, and the computer executable instructions, when executed by a computing device having one or more processors, cause the computing device to perform the aforementioned image processing method.

According to an aspect of the embodiments of this application, an electronic device is provided, including: one or more processors; and a storage apparatus, configured to store one or more programs, the one or more programs, when executed by the one or more processors, causing the one or more processors to implement the image processing method according to the foregoing embodiment.

In the technical solutions provided in some embodiments of this application, the image gradient of the to-be-processed image is calculated, the gradient of the target image obtained after the ghost reflection is removed from the to-be-processed image is determined according to the image gradient of the to-be-processed image, to generate the target image based on the gradient of the target image, so that the ghost reflection part of the to-be-processed image can be filtered out by calculating the image gradient of the to-be-processed image, and then the target image is generated based on the obtained gradient of the target image, avoiding a problem of low practicability caused by use of a plurality of similar images to eliminate the ghost reflection in related art, achieving the objective of effectively removing ghost reflection based on one image, and also ensuring high quality of a processed image.

It is to be understood that the foregoing general descriptions and the following detailed descriptions are only exemplary and explanatory, and cannot limit this application.

BRIEF DESCRIPTION OF THE DRAWINGS

Accompanying drawings herein are incorporated into a specification and form a part of this specification, showing embodiments that conform to this application, and are used to describe a principle of this application together with this specification. Apparently, the accompanying drawings described below are only some embodiments of this application, and a person of ordinary skill in the art may obtain other drawings according to these accompanying drawings without creative efforts. In the accompanying drawings.

DESCRIPTION OF EMBODIMENTS

Exemplary embodiments will now be described more fully with reference to accompanying drawings. However, the exemplary embodiments can be implemented in various forms and are not be understood as limited to examples herein; on the contrary, providing these embodiments will make this application more comprehensive and complete, and comprehensively convey a concept of the exemplary embodiments to a person skilled in the art.

In addition, described features, structures or features may be combined in one or more embodiments in any suitable manner. In the following description, many specific details are provided to give a full understanding of the embodiments of this application. However, a person skilled in the art will realize that the technical solution of the embodiments of this application can be practiced without one or more specific details, or other methods, components, devices, steps and the like can be adopted. In other cases, public methods, devices, implementations or operations are not shown or described in detail to avoid blurring aspects of the embodiments of this application.

A block diagram shown in the accompanying drawings is only functional entity and do not necessarily correspond to physically independent entity. That is, these functional entities can be implemented in a form of a software, in one or more hardware modules or integrated circuits, or in different network and/or processor devices and/or microcontroller devices.

A flowchart shown in the accompanying drawings is only an exemplary description, not necessarily including all contents and operations/steps, nor it be carried out in the order described. For example, some operations/steps can also be decomposed, while some operations/steps can be merged or partially merged, so the actual execution order may change according to the actual situation.

Figure 1:
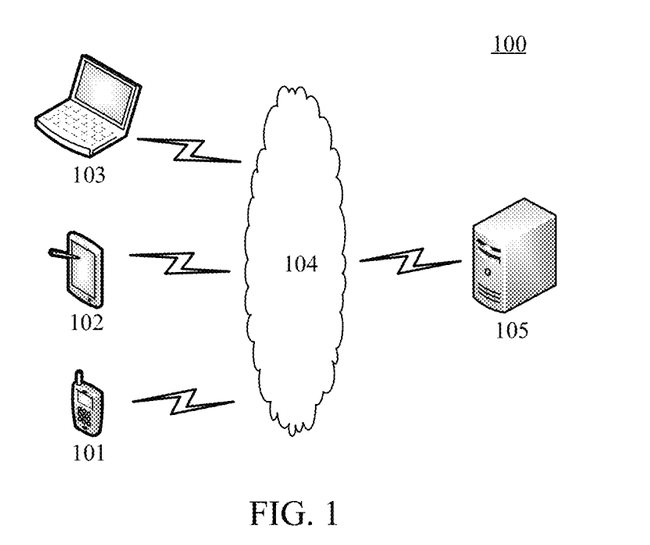
FIG. 1 is a schematic diagram of an exemplary system architecture to which an image processing method or an image processing apparatus according to an embodiment of this application may be applied.

FIG. 1 is a schematic diagram of an exemplary system architecture 100 to which an image processing method or an image processing apparatus according to an embodiment of this application may be applied.

As shown in FIG. 1, the system architecture 100 may include one or more of terminal devices 101, 102, and 103, a network 104 and a server 105. The network 104 is configured to provide a communication link medium between the terminal devices 101, 102, and 103 and the server 105. The network 104 may include various connection types, such as a wired communication link, a wireless communication link, and the like.

It is to be understood that numbers of terminal devices, networks, and servers in FIG. 1 are only schematic. According to implementation requirements, there may be any number of terminal devices, networks and servers. For example, the server 105 may be a server cluster that includes a plurality of servers, or the like.

A user may use the terminal devices 101, 102, and 103 to interact with the server 105 through the network 104, to receive or send messages, or the like. The terminal devices 101, 102, and 103 may be various electronic devices with displays, including but not limited to, smartphones, tablets, portable computers, desktop computers, and the like.

The server 105 may be a server that provides various services. For example, the user uploads a to-be-processed image with ghost reflection to the server 105 by using the terminal device 103 (or the terminal device 101 or 102). After receiving the to-be-processed image, the server 105 may calculate an image gradient of the to-be-processed image, and then determine, according to the image gradient, a gradient of a target image obtained after the ghost reflection is removed from the to-be-processed image, and generate the target image based on the gradient of the target image.

The image processing method provided in the embodiments of this application is generally performed by the server 105, and accordingly, the image processing apparatus is generally disposed in the server 105. However, in other embodiments of this application, a terminal may also have functions similar to those of a server, to execute the image processing scheme provided by the embodiments of this application. For example, after the terminal takes an image with ghost reflection, the terminal directly processes the image, to obtain a clear image obtained after the ghost reflection is removed.

Figure 2:
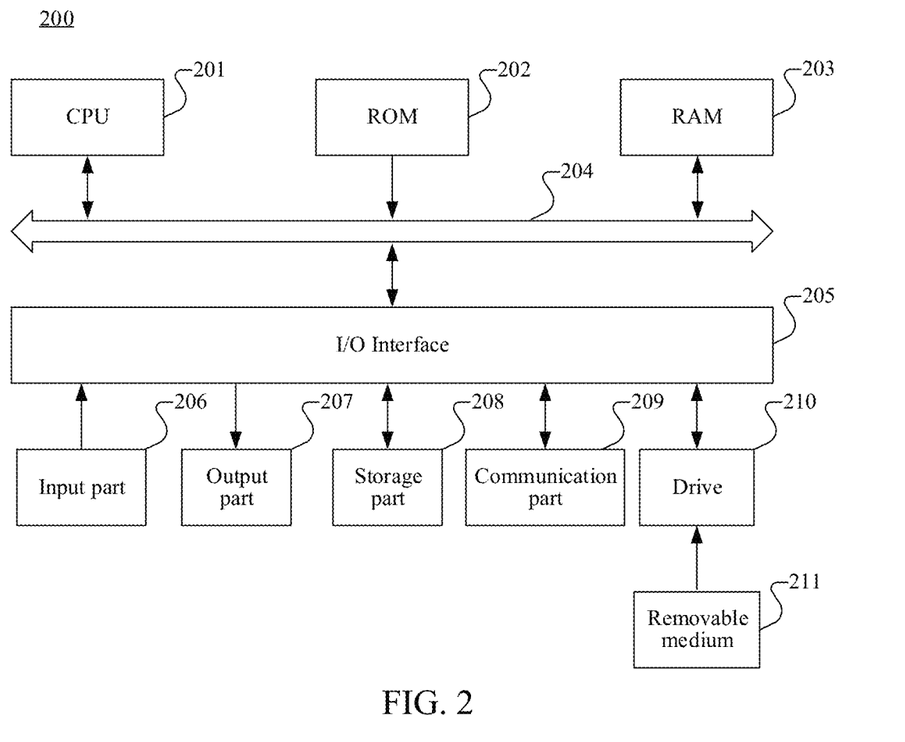
FIG. 2 is a schematic structural diagram of a computer system adapted to implement an electronic device according to an embodiment of this application.

FIG. 2 is a schematic structural diagram of a computer system adapted to implement an electronic device according to an embodiment of this application.

A computer system 200 of the electronic device shown in FIG. 2 is only an example, and does not impose any restriction on functions and scopes of use of the embodiments of this application.

As shown in FIG. 2, the computer system 200 includes a central processing unit (CPU) 201. It can perform various proper actions and processing based on a program stored in a read-only memory (ROM) 202 or a program loaded from a storage part 208 into a random access memory (RAM) 203. The RAM 203 also stores various programs and data required to operate the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk, or the like; and a communication part 209 including a network interface card such as a LAN card, a modem, or the like. The communication part 209 performs communication processing by using a network such as the Internet. A drive 210 is also connected to the I/O interface 205 as required. A removable medium 211 such as a magnetic disk, an optical disc, a magneto-optical disk, or a semiconductor memory is mounted on the driver 210 as required, so that a computer program read therefrom is installed into the storage part 208 as required.

Particularly, according to an embodiment of this application, the processes described in the following by referring to the flowcharts may be implemented as computer software programs. For example, an embodiment of this application includes a computer program product, the computer program product includes a computer program carried on a computer-readable medium, and the computer program includes program code used for performing the methods shown in the flowcharts. In such an embodiment, by using the communication part 209, the computer program may be downloaded and installed from a network, and/or installed from the removable medium 211. When the computer program is executed by the central processing unit (CPU) 201, the various functions defined in the system of this application are executed.

The computer-readable medium shown in the embodiments of this application may be a computer-readable signal medium or a computer-readable storage medium or any combination the two. The computer-readable storage medium may be, for example, but is not limited to, an electric, magnetic, optical, electromagnetic, infrared, or semi-conductive system, apparatus, or component, or any combination of the above. More specific examples of the computer-readable storage medium may include, but are not limited to, an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage medium, a magnetic storage medium, or any suitable combination of the above. In the embodiments of this application, the computer-readable storage medium may be any tangible medium including or storing a program, and the program may be used by or in combination with an instruction execution system, apparatus or component. In the embodiments of this application, the computer-readable signal medium may include a data signal propagated in a baseband or as a part of a carrier, and stores computer-readable program code. The propagated data signal may be in a plurality of forms, including but not limited to, an electromagnetic signal, an optical signal, or any suitable combination of the above. The computer-readable signal medium may alternatively be any computer-readable medium other than the computer-readable storage medium. The computer-readable medium may send, propagate or transmit a program for use by or in combination with an instruction execution system, apparatus or component. The program code included in the computer-readable medium may be transmitted by using any suitable medium, including but not limited to, wireless, wired, or the like, or any suitable combination of the above.

The flowcharts and block diagrams in the accompanying drawings show architectures, functions, and operations that may be implemented for the system, the method, and the computer program product according to the embodiments of this application. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of these units do not constitute a limitation on the units in a case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the following embodiment. For example, the electronic device may implement steps shown in FIG. 3 to FIG. 7.

Figure 3:
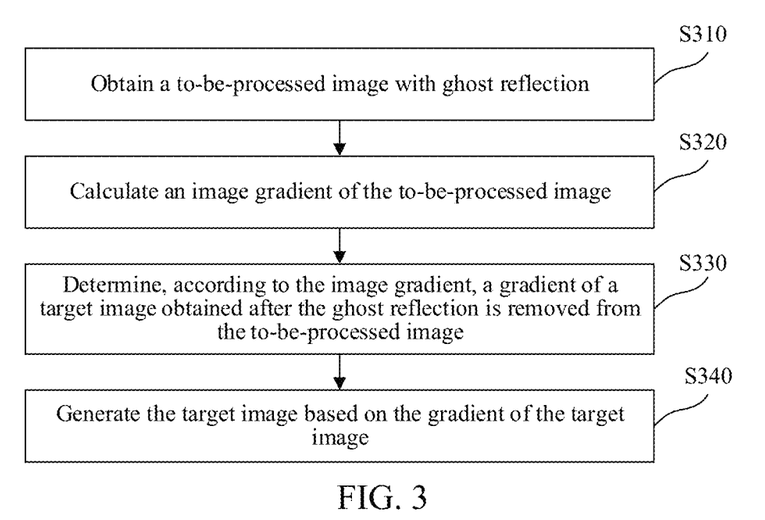
FIG. 3 schematically shows a flowchart of an image processing method according to an embodiment of this application.

The implementation details of the technical solution of the embodiments of this application are described in detail in the following:

FIG. 3 schematically shows a flowchart of an image processing method according to an embodiment of this application. The image processing method is applicable to the electronic device described in the foregoing embodiment. Referring to FIG. 3, the image processing method includes at least steps S310 to S340, which are described in detail in the following:

In step S310, a to-be-processed image with ghost reflection is obtained.

In an embodiment of this application, a to-be-processed image may be taken by a user by using a terminal (such as a smartphone, a camera, a video camera, or the like). For example, when the user shoots through glass, windows, or the like, the taken image may include ghost reflection due to the reflection of the glass.

In step S320, an image gradient of the to-be-processed image is calculated.

In an embodiment of this application, when the image gradient of the to-be-processed image is calculated, the image may be regarded as a two-dimensional discrete function, and the calculation of the image gradient is actually a derivation of the two-dimensional discrete function.

In step S330, a gradient of a target image obtained after the ghost reflection is removed from the to-be-processed image is determined according to the image gradient.

In an embodiment of this application, step S330 specifically includes: calculating a gradient magnitude of each pixel in the to-be-processed image according to the image gradient; determining a gradient value of each pixel in the target image based on the gradient magnitude of each pixel in the to-be-processed image; and determining the gradient of the target image according to the gradient value of each pixel in the target image.

In this embodiment, compared with the target image with a clear object boundary, the ghost reflection is usually fuzzy and a color change is gentle. Then, the gradient value of the target image is 0 on most pixels, while a gradient magnitude of a few non-zero parts is large, but the magnitude of the ghost reflection part on all pixels is small. Therefore, the gradient value of each pixel in the target image may be determined according to the gradient magnitude of each pixel in the to-be-processed image.

Specifically, in an embodiment of this application, a first-type pixel of which the gradient magnitude is less than a magnitude threshold and a second-type pixel of which the gradient magnitude is greater than or equal to the magnitude threshold may be determined in the to-be-processed image according to the gradient magnitude of each pixel in the to-be-processed image; then a gradient value of the first-type pixel is set to 0, to obtain an updated gradient value of the first-type pixel; and the updated gradient value of the first-type pixel and a gradient value of the second-type pixel are further used as the gradient value of each pixel in the target image. The gradient of the target image determined in this embodiment of this application is an approximate gradient of the target image.

In an embodiment of this application, if a magnitude threshold is set excessively small, the ghost reflection is not completely removed; if a magnitude threshold is set excessively large, some details in the image are incorrectly removed. Therefore, when the magnitude threshold is selected, a relatively proper value needs to be selected according to an intensity of the ghost reflection, that is, the size of the magnitude threshold is associated with the intensity of the ghost reflection.

In some embodiments, the magnitude threshold may be determined by using a preset calculation method according to the gradient magnitude of each pixel in the to-be-processed image. For example, the magnitude threshold may be determined according to a maximum value, a minimum value, a mean value, a median value and the like of the gradient magnitude of each pixel in the to-be-processed image. A specific algorithm may be set according to requirements, and this is not limited herein.

In some other embodiments, the value of the magnitude threshold may be selected by the user. An initial target image may be first generated by using a preset initial value of the magnitude threshold, and the initial target image is displayed in a user interface. A threshold input interface is provided in the user interface, and an updated value of the magnitude threshold is determined according to an operation of a user on the threshold input interface. An updated target image is generated by using the updated value of the magnitude threshold, and the updated target image is displayed in the user interface.

The threshold input interface may be a text input interface or a graphical selection control, such as a sliding selection control, a rolling selection control, or the like. When the threshold input interface is implemented by using the text input interface, the input value range may be displayed on the user interface, so that the user can input the value within the value range as required. When the threshold input interface is implemented by using the graphical selection control, a plurality of discrete values may be provided as options by using the selection control, or a continuous range of optional values may be provided for the user to select.

The foregoing process of determining the updated value of the magnitude threshold and generating the updated target image may be performed repeatedly according to the operation of the user, so that the user can obtain the target image with an optimal effect by selecting the updated value.

Continuing to refer to FIG. 3, in step S340, the target image is generated based on the gradient of the target image.

In the technical solution of the embodiment shown in FIG. 3, the ghost reflection part of the to-be-processed image can be filtered out by calculating the image gradient of the to-be-processed image, and then the target image is generated based on the obtained gradient of the target image, achieving the objective of effectively removing the ghost reflection based on one image, and also ensuring high quality of a processed image.

In each embodiment, when the target image is generated, a gradient matrix of the to-be-processed image is determined. A first element corresponding to the ghost reflection in the to-be-processed image is determined according to values of elements in the gradient matrix, the gradient matrix is preset by using the first element, and a processed gradient matrix is used as a gradient matrix of the target image. The target image is restored by using the gradient matrix of the target image and the to-be-processed image.

For example, the to-be-processed image may be represented by a matrix I with a dimension of M×N, and M and N respectively represent numbers of pixels in each row and each column of the to-be-processed image. A gradient may be calculated for the to-be-processed image I, for example, the gradient matrix $\nabla I$ of I may be obtained by calculating differences between values of adjacent pixels.

In the to-be-processed image, a boundary of a photographed object is usually clear, that is, a color change is steep, while the ghost reflection is fuzzy and the color change is gentle. That is, a gradient of the photographed object is 0 on most pixels, while a magnitude of a few non-zero parts is relatively large, while the magnitude of the image part including the ghost reflection is relatively small on all pixels. Therefore, a preset processing $\delta_h(\nabla I)$ may be performed on $\nabla I$, so that the gradient matrix obtained after processing is approximate to the gradient matrix of the target image. $\delta_h(\nabla I)$ represents a preset processing for removing impact of the ghost reflection from the gradient matrix of the to-be-processed image.

In each embodiment, $\delta_h(\cdot)$ may be any feasible processing method. For example, $$\delta_h(z) = \begin{cases} 0, & |z| < h \\ z, & |z| \geq h \end{cases},$$

where h represents a threshold of the gradient magnitude. According to the processing method of this example, the gradient of a pixel of which the gradient magnitude is greater than h will be replaced with 0, that is, a color change of a corresponding pixel relative to a surrounding pixel will be smoothed. For another example, $\delta_h(\cdot)$ may include clustering values of elements in the gradient matrix $\nabla I$ of I by using a clustering algorithm, to obtain a plurality of clusters. Values of elements that are in the gradient matrix $\nabla I$ and that belong to at least one of the foregoing plurality of clusters (for example, at least one cluster of which a mean value or a cluster center value is not 0, and that is not the largest one)

are set to 0. The foregoing is merely an example. In other embodiments, $\delta_h(\cdot)$ may alternatively be another processing method.

In some embodiments, when the target image is restored by using the gradient matrix of the target image and the to-be-processed image, a Laplace transform result for a divergence of the gradient matrix of the target image may be determined. The target image is restored by using the Laplace transform result and the to-be-processed image.

For example, the to-be-processed image I and the target image T may be regarded as the matrix of M×N, and substituted into the following formula to find a solution:

$$(\mathcal{L}^2+\varepsilon)T=\mathcal{L}(\mathrm{div}(\delta_h(\nabla I)))+\varepsilon I$$

where $\mathcal{L}(\cdot)$ represents a Laplace transform; $\nabla I$ represents the gradient matrix of the to-be-processed image I; $\delta_h(\nabla I)$ represents the preset processing for removing the impact of the ghost reflection from the gradient matrix of the to-be-processed image; $\mathrm{div}(\cdot)$ represents a divergence operator; E is a preset weight, greater than 0 and less than 1; M and N respectively represent numbers of pixels in each row and each column of the to-be-processed image, that is, a dimension of the matrix I.

In some embodiments, when the target image is obtained by using the Laplacian transform result and the to-be-processed image, a weighted sum of the Laplacian transform result and the to-be-processed image may be determined; a discrete cosine transform result of the weighted sum is determined; an inverse discrete cosine transform is performed on a quotient of the discrete cosine transform result and a position characteristic quantity of each pixel, and the value of the inverse transform is used as a pixel value of each pixel.

For example, the pixels $T_{m,n}$ an $m^{th}$ row and an $n^{th}$ column of the target image T may be solved by using the following formula:

$$T_{m,n} = \mathcal{F}_c^{-1}\left(\frac{[\mathcal{F}_c(P)]_{m,n}}{K_{m,n}^2 + \varepsilon}\right)$$

where $F_c(\cdot)$ represents a discrete cosine transform, $F_c^{-1}(\cdot)$ represents an inverse discrete cosine transform, $P=\mathcal{L}(\mathrm{div}(\delta_h(\nabla I)))+\varepsilon I$;

$$K_{m,n} = 2\left(\cos\left(\frac{m\pi}{M}\right) + \cos\left(\frac{n\pi}{N}\right) - 2\right);$$

M and N respectively represent numbers of pixels in each row and each column of the to-be-processed image, that is, a dimension of the matrix I.

In some embodiments, the foregoing processing may be separately performed on each color channel of the to-be-processed image, to obtain a monochromatic target image of each color channel, and then the monochromatic target images of the color channels are merged to obtain the target image. That is, an image gradient corresponding to each color channel of the to-be-processed image may be calculated; a gradient corresponding to each color channel of the target image is determined according to the image gradient corresponding to each color channel; a monochromatic image corresponding to each color channel is generated based on the gradient corresponding to each color channel of the target image; and the target image is synthesized by using the monochromatic image corresponding to each color channel.

Figure 4:
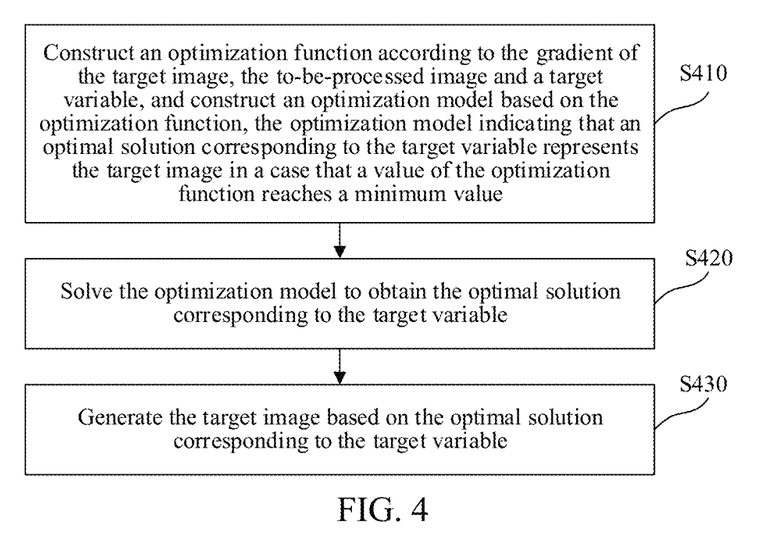
FIG. 4 schematically shows a flowchart of generating a target image based on a gradient of the target image according to an embodiment of this application.

Referring to FIG. 4, a flowchart of generating a target image based on a gradient of the target image according to an embodiment of this application includes the following step S410, step S420, and step S430.

In step S410, an optimization function is constructed according to a gradient of the target image, the to-be-processed image and a target variable, and an optimization model is constructed based on the optimization function, the optimization model indicating that an optimal solution corresponding to the target variable represents the target image in a case that a value of the optimization function reaches a minimum value.

Figure 5:
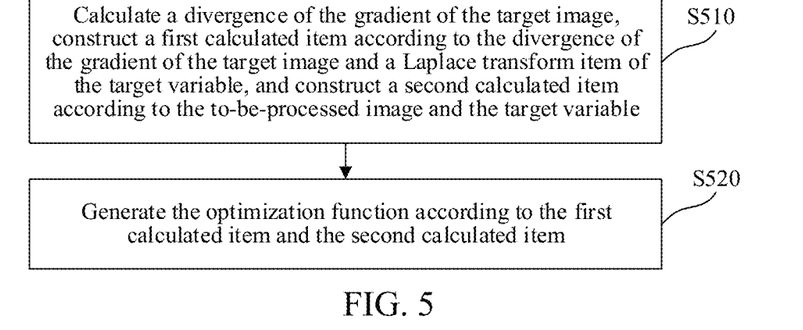
FIG. 5 schematically shows a flowchart of constructing an optimization function according to an embodiment of this application.

In an embodiment of this application, as shown in FIG. 5, the process of constructing the optimization function may include the following step S510 and step S520:

In step S510, a divergence of the gradient of the target image is calculated, a first calculated item is constructed according to the divergence of the gradient of the target image and a Laplace transform item of the target variable, and a second calculated item is constructed according to the to-be-processed image and the target variable.

In an embodiment of this application, a difference between the Laplace transform item of the target variable and the divergence of the gradient of the target image may be calculated, and then a square of two norms of the difference is calculated as the first calculated item. At the same time, the difference between the to-be-processed image and the target variable may also be calculated, and then the square of two norms of the difference may be used as the second calculated item.

Because derivatives included in the first calculated item are all first-order derivatives and second-order derivatives, there are infinite solutions when a derivation operation is performed to determine an optimal solution. Therefore, the second calculated item is added in the foregoing embodiment to ensure that the optimal function has only a unique solution during solution.

In step S520, the optimization function is generated according to the first calculated item and the second calculated item.

In an embodiment of this application, step S520 specifically includes: generating a weight of the first calculated item and a weight of the second calculated item, the weight of the second calculated item being less than the weight of the first calculated item; and performing weighted summation on the first calculated item and the second calculated item according to the weight of the first calculated item and the weight of the second calculated item, to generate the optimization function.

In this embodiment, because the second calculated item is to ensure that the optimization function has only a unique solution during solution, the weight of the second calculated item may be set to a relatively small value, to avoid relatively large impact on the solution of the optimization function.

In an embodiment of this application, the optimization function may be generated according to the following formula:

$$k_1\|\mathcal{L}(T)-\mathrm{div}(\delta_h(\nabla I))\|_2^2 + k_2\|T-I\|_2^2$$

where $\mathcal{L}(T)$ represents the Laplace transform item of the target variable; $\delta_h(\nabla I)$ represents the gradient of the target image; $\mathrm{div}(\cdot)$ represents a divergence operator; T represents the target variable; I represents the to-be-processed image;

$k_1$ represents the weight of the first calculated item; and $k_2$ represents the weight of the second calculated item.

In an embodiment of this application, $k_1$ may be ½, $k_2$ may be $$\frac{\varepsilon}{2},$$

and $\varepsilon$ is a parameter.

Continuing to refer to FIG. 4, in step S420, the optimization model is solved to obtain the optimal solution corresponding to the target variable.

Figure 6:
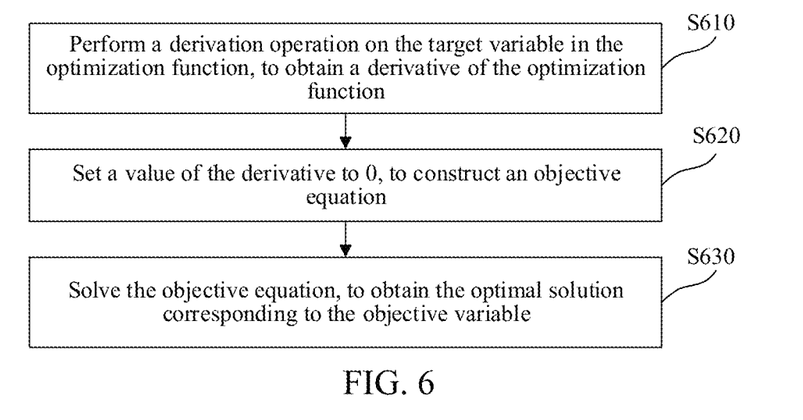
FIG. 6 schematically shows a flowchart of solving an optimization model according to an embodiment of this application.

In an embodiment of this application, as shown in FIG. 6, solving the optimization model may specifically include the following steps:

Step S610: Perform a derivation operation on the target variable in the optimization function, to obtain a derivative of the optimization function.

Step S620: Set a value of the derivative to 0, to construct an objective equation.

Step S630: Solve the objective equation, to obtain the optimal solution corresponding to the objective variable.

In an embodiment of this application, the solution process of the target equation may be performing a discrete cosine transform on the target equation; and then obtaining the optimal solution corresponding to the target variable based on a discrete cosine transform result of the target equation.

Continuing to refer to FIG. 4, in step S430, the target image is generated based on the optimal solution corresponding to the target variable.

Figure 7:
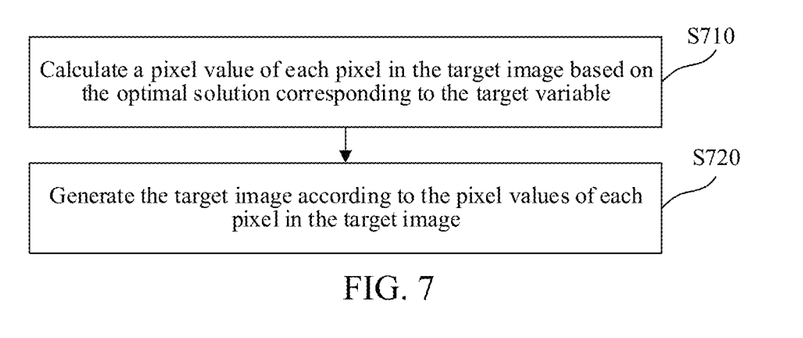
FIG. 7 schematically shows a flowchart of generating a target image based on an optimal solution corresponding to a target variable according to an embodiment of this application.

In an embodiment of this application, as shown in FIG. 7, the process of generating the target image based on the optimal solution corresponding to the target variable includes the following steps:

Step S710: Calculate a pixel value of each pixel in the target image based on the optimal solution corresponding to the target variable.

In an embodiment of this application, a color value of each color channel corresponding to each pixel in the target image may be separately calculated based on the optimal solution corresponding to the target variable, and the pixel value of each pixel in the target image is determined according to the color value of each color channel corresponding to each pixel in the target image.

In an embodiment of this application, for RGB images, each pixel corresponds to three color channels, namely, R, G and B. After the color value of each color channel corresponding to each pixel is obtained, the pixel value of each pixel may be obtained.

Step S720: Generate the target image according to the pixel value of each pixel in the target image.

In the technical solution of the foregoing embodiment of this application, it can be ensured that a global optimal solution is obtained by constructing a convex function (that is, the foregoing optimization function), and the solution of the optimization function can be quickly found, to improve the efficiency of image processing.

Implementation details of the technical solution of this embodiment of this application are described below in detail with reference to FIG. 8 to FIG. 11 by using an example in which a to-be-processed image is I, a ghost reflection part is a reflection layer R, and a part without ghost reflection is a transmission layer T.

Figure 8:
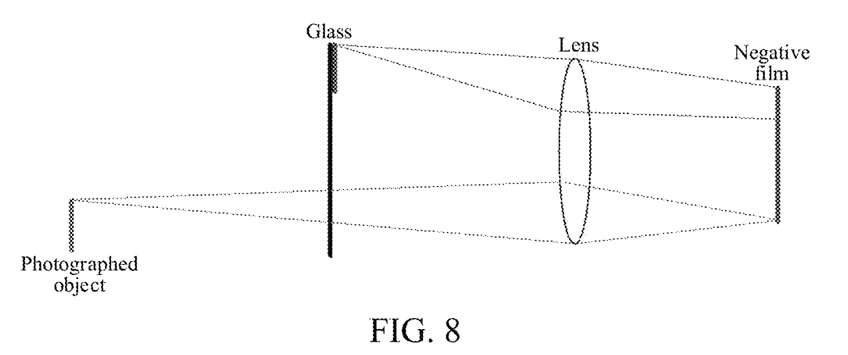
FIG. 8 is a schematic diagram of an imaging process during photographing according to an embodiment of this application.

In an embodiment of this application, the to-be-processed image I may be decomposed into the transmission layer T and the reflection layer R, that is I=T+R. Assuming that the reflection layer R is gentle and smooth, the gradient of the to-be-processed image I is calculated to obtain the following equation:

$$\nabla I = \nabla T + \nabla R$$

As shown in FIG. 8, in an actual photographing process, a camera lens focuses on a photographed object behind the glass, and a reflected object on the glass cannot be fully focused because the reflected object is relatively close to the lens. Therefore, imaging on a negative film is relatively fuzzy.

Based on the foregoing analysis, it can be learned that compared with the transmission layer T with a clear object boundary, the reflection layer R is relatively fuzzy and the color change is relatively gentle. In mathematical language, that is, $\nabla T$ is 0 on most pixels, while the magnitude of a few non-zero parts is relatively large, and the magnitude of $\nabla R$ on all pixels is relatively small. Therefore, the smaller part of $\nabla R$ can be removed by using a truncation function, so that the gradient obtained after truncation is approximate to $\nabla T$, that is $$\nabla T \approx \delta_h(\nabla I)$$

the truncation function is defined as:

$$\delta_h(z) = \begin{cases} 0, & |z| < h \\ z, & |z| \geq h \end{cases}$$

In definition of a truncation function, h represents a threshold of a gradient magnitude, the gradient of pixel of which the gradient magnitude is greater than h will be replaced with 0, that is, the color change of the corresponding pixel relative to the surrounding pixel will be smoothed.

According to the foregoing principle, when an image I is given, the transmission layer T can be obtained through inverse solution. In an embodiment of this application, the process of inverse solution to obtain a transmission layer T depends on the following optimization model:

$$\min_T \frac{1}{2}\|\mathcal{L}(T) - div(\delta_h(\nabla I))\|_2^2 + \frac{\varepsilon}{2}\|T - I\|_2^2$$

The foregoing optimization model indicates that a corresponding T value when the value of the objective function $$\frac{1}{2}\|\mathcal{L}(T) - div(\delta_h(\nabla I))\|_2^2 + \frac{\varepsilon}{2}\|T - I\|_2^2$$

minimum is an obtained transmission layer T.

In the foregoing optimization model, $\mathcal{L}(T)$ represents a Laplace transform for the transmission layer T, used for extracting edges of objects in photos (that is, the boundary with obvious color change), where the Laplace transform for the transmission layer T is equal to its two-step gradient, that is, $\mathcal{L}(T) = \nabla_{xx}(T) + \nabla_{yy}(T)$. div(•) represents a divergence operator, that is, a negative transpose of a gradient operator. In an objective function, $\|\mathcal{L}(T) - div(\delta_h(\nabla I))\|_2^2$ is used for indicating that the edge of the object in the transmission layer T is as close as possible to the obvious edge of the object in the input image I.

Because derivatives included in the objective function $\|\mathcal{L}(T) - div(\delta_h(\nabla I))\|_2^2$ are all first-order derivatives and second-order derivatives, there are infinite solutions when a derivation operation is performed to determine an optimal solution. Therefore, $\|T-I\|_2^2$ is added in the objective function to ensure that the objective function has only a unique solution during solution. To avoid the relatively large impact of $\|T-I\|_2^2$ added in the objective function on the result, a minimum value may be assigned to the parameter ε, to ensure that the processed image has relatively good quality.

To solve the foregoing optimization model, the derivative of the variable T may be obtained in the objective function, the derivative is set to 0, and the following equation can be obtained:

$$(\mathcal{L}^2+\varepsilon)T = \mathcal{L}(\text{div}(\delta_h(\nabla I)))+\varepsilon I$$

The foregoing equation is a Poisson like equation, which can be solved by using a standard discrete cosine transform, to obtain a closed-form solution shown in Formula 1 below:

$$T_{m,n} = \mathcal{F}_c^{-1}\left(\frac{[\mathcal{F}_c(P)]_{m,n}}{K_{m,n}^2 + \varepsilon}\right) \quad \text{Formula 1}$$

In Formula 1, P represents $\mathcal{L}(\text{div}(\delta_h(\nabla I))+\varepsilon I$; $F_c(\bullet)$ represents a discrete cosine transform, $F_c^{-1}(\bullet)$ represents a corresponding inverse transform, and a subscript (m, n) represents a pixel in an $m^{th}$ row and an $n^{th}$ column, K is defined by Formula 2 as follows:

$$K_{m,n} = 2\left(\cos\left(\frac{m\pi}{M}\right) + \cos\left(\frac{n\pi}{N}\right) - 2\right) \quad \text{Formula 2}$$

In the foregoing Formula 2, M and N represent that the pixel dimension of a to-be-processed image I is M*N.

Based on the foregoing theoretical basis, when an input image I with a glass ghost reflection is given, T can be calculated according to the foregoing Formula 1, where a color image has three color channels: red, green and blue, and therefore each color channel is calculated according to the foregoing Formula 1, and then the color channels are merged. In the process of solution, values of parameters a and h need to be specified. In an embodiment of this application, the value of a may be [$10^{-7}$, $10^{-9}$], for example, $10^{-7}$, $10^{-8}$ or $10^{-9}$, to achieve a better effect of removing ghosting. If the value of h is excessively small, the reflection layer ghosting is not completely removed; if the value of h is excessively large, details of the transmission layer are incorrectly removed. Therefore, the value of h needs to be adjusted according to the intensity of a glass ghost reflection in the input image, to achieve the best effect.

Figure 9:
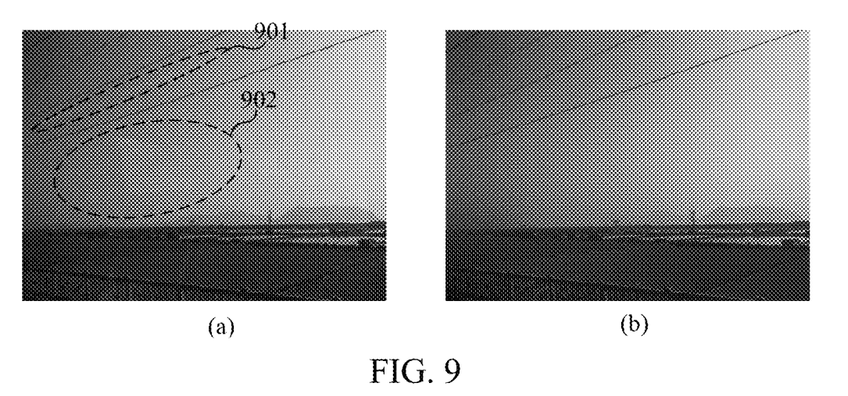
FIG. 9 is a schematic diagram of a contrast effect before and after an image with ghost reflection is processed according to an embodiment of this application.

In the technical solution of this embodiment of this application, the ghost reflection in the image can be effectively removed, which is specifically shown in FIG. 9. Diagram (a) of FIG. 9 shows an image with ghost reflection, and Diagram (b) of FIG. 9 shows an image obtained after processing according to the technical solution of this embodiment of this application. It can be learned that based on the technical solution of this embodiment of this application, the ghost reflection 901 and the ghost reflection 902 in Diagram (a) of FIG. 9 are effectively removed.

Figure 10:
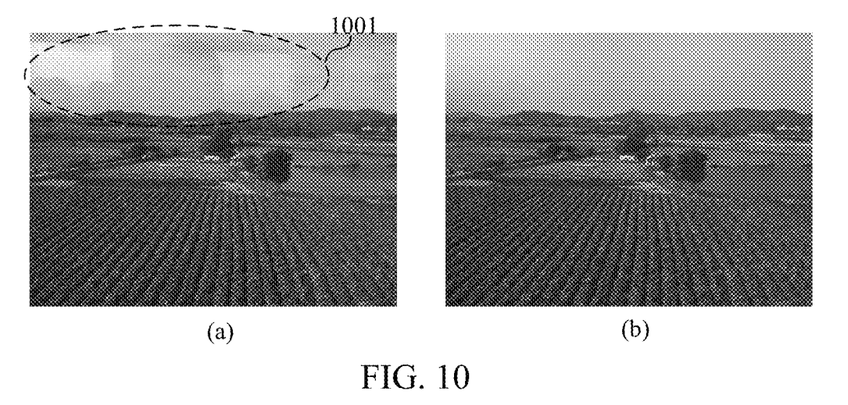
FIG. 10 is a schematic diagram of a contrast effect before and after an image with ghost reflection is processed according to an embodiment of this application.

As shown in FIG. 10, Diagram (a) of FIG. 10 shows an image with ghost reflection, and Diagram (b) of FIG. 10 shows an image obtained after processing according to the technical solution of this embodiment of this application. It can be learned that based on the technical solution of this embodiment of this application, the ghost reflection 1001 in Diagram (a) of FIG. 10 is effectively removed.

Figure 11:
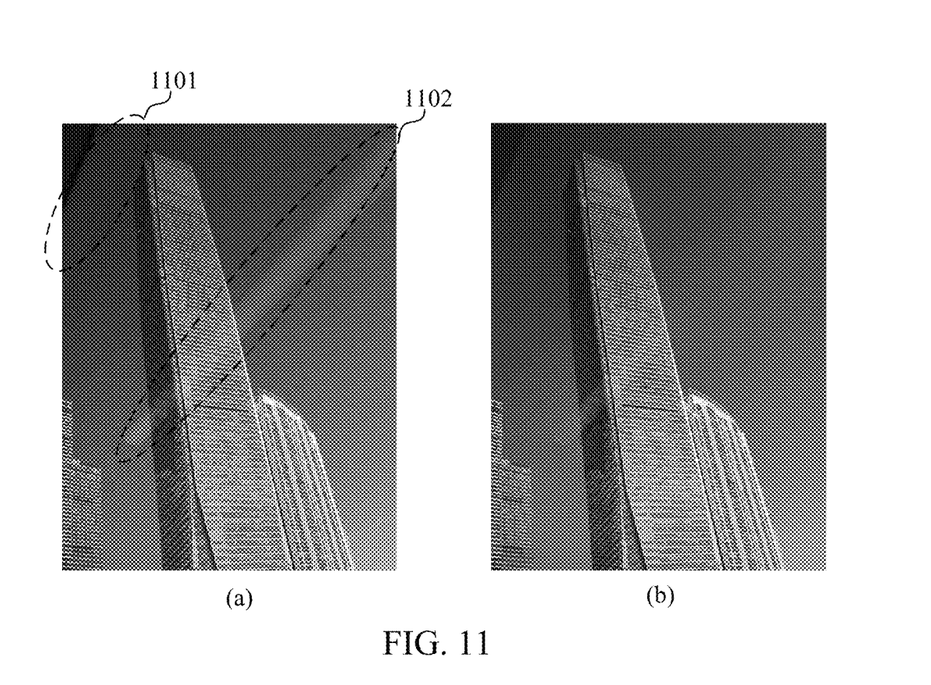
FIG. 11 is a schematic diagram of a contrast effect before and after an image with ghost reflection is processed according to an embodiment of this application.

As shown in FIG. 11, Diagram (a) of FIG. 11 shows an image with ghost reflection, and Diagram (b) of FIG. 11 shows an image obtained after processing according to the technical solution of this embodiment of this application. It can be learned that based on the technical solution of this embodiment of this application, the ghost reflection 1101 in Diagram (a) of FIG. 11 is effectively removed, and the ghost reflection 1102 in Diagram (a) of FIG. 11 is extremely weakened.

In an embodiment of this application, the image processing algorithm in the embodiments of this application can be implemented on MATLAB 2017a. When the computer is configured with an 8-core Intel i7-8550U 1.80 GHz CPU and a 16 GB memory, for a 1440*1080-pixel photo taken by a mobile phone, the processing time of the image using the technical solution of the embodiments of this application does not exceed 1.5 seconds, which is approximately 800 times faster than the current best image processing algorithm (such as the algorithm for eliminating ghost reflection through an iterative method). It can be learned that in the technical solution of the embodiments of this application, not only ghost reflection in an image is effectively removed, but also an image processing rate can be improved.

The following describes apparatus embodiments of the embodiments of this application, and the apparatus embodiments can be used for performing the image processing method in the foregoing embodiment of this application. For details not disclosed in the device embodiment of this application, refer to the foregoing embodiment of the image processing method in the embodiments of this application.

Figure 12:
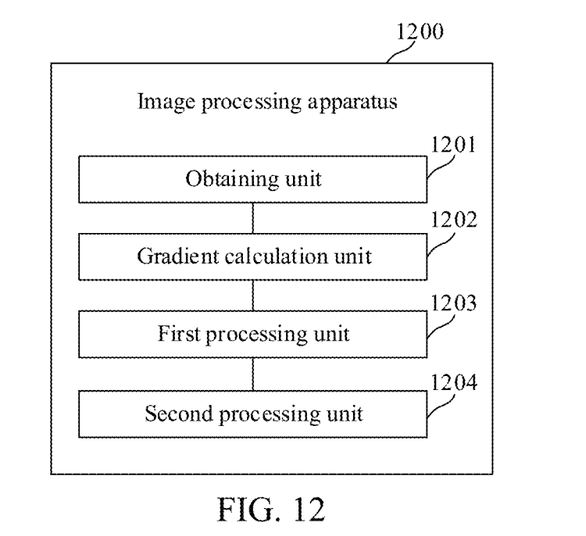
FIG. 12 schematically shows a block diagram of an image processing apparatus according to an embodiment of this application.

FIG. 12 schematically shows a block diagram of an image processing apparatus according to an embodiment of this application.

Referring to FIG. 12, an image processing apparatus 1200 according to an embodiment of this application includes: an obtaining unit 1201, a gradient calculation unit 1202, a first processing unit 1203 and a second processing unit 1204.

The obtaining unit 1201 is configured to obtain a to-be-processed image with ghost reflection. The gradient calculation unit 1202 is configured to calculate an image gradient of the to-be-processed image. The first processing unit 1203 is configured to determine, according to the image gradient, a gradient of a target image obtained after the ghost reflection is removed from the to-be-processed image. The second processing unit 1204 is configured to generate the target image based on the gradient of the target image.

Figure 13:
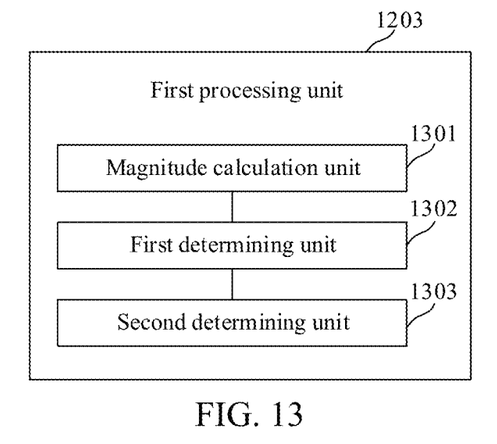
FIG. 13 schematically shows a block diagram of a first processing unit according to an embodiment of this application.

In an embodiment of this application, as shown in FIG. 13, the first processing unit 1203 includes: a magnitude calculation unit 1301, a first determining unit 1302 and a second determining unit 1303.

The magnitude calculation unit 1301 is configured to calculate a gradient magnitude of each pixel in the to-be-processed image according to the image gradient. The first determining unit 1302 is configured to determine a gradient value of each pixel in the target image based on the gradient magnitude of each pixel in the to-be-processed image. The second determining unit 1303 is configured to determine the gradient of the target image according to the gradient value of each pixel in the target image.

In an embodiment of the present disclosure, the first determining unit 1302 is configured to: determine, in the to-be-processed image, a first-type pixel of which the gradient magnitude is less than a magnitude threshold and a second-type pixel of which the gradient magnitude is greater than or equal to the magnitude threshold; set a gradient value of the first-type pixel to 0, to obtain an updated gradient value of the first-type pixel; and use the updated gradient value of the first-type pixel and a gradient value of the second-type pixel as the gradient value of each pixel in the target image.

In an embodiment of the present disclosure, the size of the magnitude threshold is associated with the intensity of the ghost reflection. In each embodiment, the magnitude threshold may be determined by using a preset calculation method according to a gradient magnitude of each pixel in a to-be-processed image, or the value of the magnitude threshold can be selected by a user. For details, refer to the foregoing text, and details are not described herein again.

In some embodiments, the second processing unit 1204 may determine a gradient matrix of the to-be-processed image. A first element corresponding to the ghost reflection in the to-be-processed image is determined according to values of elements in the gradient matrix, the gradient matrix is preset by using the first element, and a processed gradient matrix is used as a gradient matrix of the target image. The target image is restored by using the gradient matrix of the target image and the to-be-processed image.

For example, the second processing unit 1204 may represent the to-be-processed image by using a matrix I with a dimension of M×N, and M and N respectively represent numbers of pixels in each row and each column of the to-be-processed image. A gradient may be calculated for the to-be-processed image I, for example, the gradient matrix ∇I of I may be obtained by calculating differences between values of adjacent pixels.

In the to-be-processed image, a boundary of a photographed object is usually clear, that is, a color change is steep, while the ghost reflection is fuzzy and the color change is gentle. That is, a gradient of the photographed object is 0 on most pixels, while a magnitude of a few non-zero parts is relatively large, while the magnitude of the image part including the ghost reflection is relatively small on all pixels. Therefore, a preset processing $\delta_h(\nabla I)$ may be performed on ∇I, so that the gradient matrix obtained after processing is approximate to the gradient matrix of the target image represents a preset processing for removing impact of the ghost reflection from the gradient matrix of the to-be-processed image.

In each embodiment, $\delta_h(\cdot)$ may be any feasible processing method. For example, $$\delta_h(z) = \begin{cases} 0, & |z| < h \\ z, & |z| \geq h \end{cases},$$

wherein h represents a threshold of the gradient magnitude. According to the processing method of this example, the gradient of a pixel of which the gradient magnitude is greater than h will be replaced with 0, that is, a color change of a corresponding pixel relative to a surrounding pixel will be smoothed. For another example, $\delta_h(\cdot)$ may include clustering values of elements in the gradient matrix ∇I of I by using a clustering algorithm, to obtain a plurality of clusters. Values of elements that are in the gradient matrix ∇I and that belong to at least one of the foregoing plurality of clusters (for example, at least one cluster of which a mean value or a cluster center value is not 0, and that is not the largest one) are set to 0. The foregoing is merely an example. In other embodiments, $\delta_h(\cdot)$ may alternatively be another processing method.

In some embodiments, when the target image is restored by using the gradient matrix of the target image and the to-be-processed image, the second processing unit 1204 may determine a Laplace transform result for a divergence of the gradient matrix of the target image. The target image is restored by using the Laplace transform result and the to-be-processed image.

For example, the to-be-processed image I and the target image T may be regarded as the matrix of M×N, and substituted into the following formula to find a solution:

$$(\mathcal{L}^2+\varepsilon)T = \mathcal{L}(\mathrm{div}(\delta_h(\nabla I))) + \varepsilon I$$

where $\mathcal{L}(\cdot)$ represents a Laplace transform; ∇I represents the gradient matrix of the to-be-processed image I; $\delta_h(\nabla I)$ represents the preset processing for removing the impact of the ghost reflection from the gradient matrix of the to-be-processed image; div(·) represents a divergence operator; E is a preset weight, greater than 0 and less than 1; M and N respectively represent numbers of pixels in each row and each column of the to-be-processed image, that is, a dimension of the matrix I.

In some embodiments, when the target image is obtained by using the Laplacian transform result and the to-be-processed image, the second processing unit 1204 may determine a weighted sum of the Laplace transform result and the to-be-processed image; determine a discrete cosine transform result of the weighted sum; perform an inverse discrete cosine transform on a quotient of the discrete cosine transform result and a position characteristic quantity of each pixel, and use the value of the inverse transform as a pixel value of each pixel.

For example, the pixels $T_{m,n}$ an $m^{th}$ row and an $n^{th}$ column of the target image T may be solved by using the following formula:

$$T_{m,n} = \mathcal{F}_c^{-1}\left(\frac{[\mathcal{F}_c(P)]_{m,n}}{K_{m,n}^2 + \varepsilon}\right)$$

where $F_c(\cdot)$ represents a discrete cosine transform, $F_c^{-1}(\cdot)$ represents an inverse discrete cosine transform, $P = \mathcal{L}(\mathrm{div}(\delta_h(\nabla I))) + \varepsilon I$;

$$K_{m,n} = 2\left(\cos\left(\frac{m\pi}{M}\right) + \cos\left(\frac{n\pi}{N}\right) - 2\right);$$

M and N respectively represent numbers of pixels in each row and each column of the to-be-processed image, that is, a dimension of the matrix I.

In some embodiments, the second processing unit 1204 may separately perform the foregoing processing on each color channel of the to-be-processed image, to obtain a monochromatic target image of each color channel, and then merge the monochromatic target images of the color channels to obtain the target image. That is, an image gradient corresponding to each color channel of the to-be-processed image may be calculated; a gradient corresponding to each color channel of the target image is determined according to the image gradient corresponding to each color channel; a monochromatic image corresponding to each color channel is generated based on the gradient corresponding to each color channel of the target image; and the target image is synthesized by using the monochromatic image corresponding to each color channel.

Figure 14:
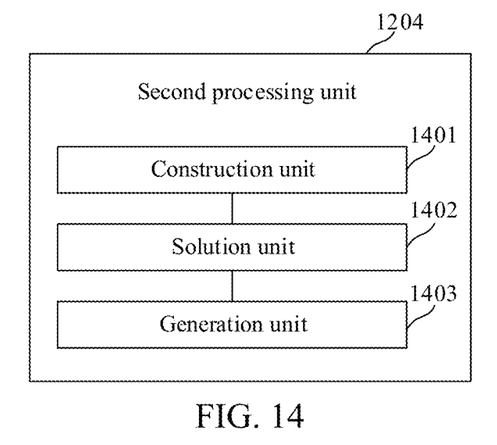
FIG. 14 schematically shows a block diagram of a second processing unit according to an embodiment of this application.

In an embodiment of this application, as shown in FIG. 14, the second processing unit 1204 includes a construction unit 1401, a solution unit 1402 and a generation unit 1403.

The construction unit 1401 is configured to: construct an optimization function according to a gradient of the target image, the to-be-processed image and a target variable, and construct an optimization model based on the optimization function, the optimization model indicating that an optimal solution corresponding to the target variable represents the target image in a case that a value of the optimization function reaches a minimum value. The solution unit 1402 is configured to solve the optimization model to obtain an optimal solution corresponding to the target variable. The generation unit 1403 is configured to generate the target image based on the optimal solution corresponding to the target variable.

In an embodiment of this application, the construction unit 1401 is configured to: calculate a divergence of the gradient of the target image, construct a first calculated item according to the divergence of the gradient of the target image and a Laplace transform item of the target variable, construct a second calculated item according to the to-be-processed image and the target variable; and generate the optimization function according to the first calculated item and the second calculated item.

In an embodiment of this application, the construction unit 1401 is configured to: generate a weight of the first calculated item and a weight of the second calculated item, the weight of the second calculated item being less than the weight of the first calculated item; and perform weighted summation on the first calculated item and the second calculated item according to the weight of the first calculated item and the weight of the second calculated item, to generate the optimization function.

In an embodiment of this application, the construction unit 1401 is configured to generate an optimization function according to the following formula:

$$k_1 \| \mathcal{L}(T) - \mathrm{div}(\delta_h(\nabla I)) \|_2^2 + k_2 \| T - I \|_2^2$$

where $\mathcal{L}(T)$ represents the Laplace transform item of the target variable; $\delta_h(\nabla I)$ represents the gradient of the target image; $\mathrm{div}(\cdot)$ represents a divergence operator; $T$ represents the target variable; $I$ represents the to-be-processed image; $k_1$ represents the weight of the first calculated item; and $k_2$ represents the weight of the second calculated item.

In an embodiment of this application, the solution unit 1402 is configured to: perform a derivation operation on the target variable in the optimization function, to obtain a derivative of the optimization function; set a value of the derivative to 0, to construct an objective equation; and solve the objective equation, to obtain the optimal solution corresponding to the objective variable.

In an embodiment of this application, the solution unit 1402 is configured to: perform a discrete cosine transform on the target equation; and obtain the optimal solution corresponding to the target variable based on a discrete cosine transform result of the target equation.

In an embodiment of this application, the generation unit 1403 is configured to: calculate a pixel value of each pixel in the target image based on the optimal solution corresponding to the target variable; and generate the target image according to the pixel value of each pixel in the target image.

In an embodiment of this application, the generation unit 1403 is configured to: separately calculate a color value of each color channel corresponding to each pixel in the target image based on the optimal solution corresponding to the target variable; and determine the pixel value of each pixel in the target image according to the color value of each color channel corresponding to each pixel in the target image.

Although several modules or units of the device for performing actions are mentioned in detailed description above, such division is not mandatory. In fact, according to the embodiments of this application, features and functions of two or more modules or units described above may be specified in one module or unit. On the contrary, the features and functions of one module or unit described above may be further divided into a plurality of modules or units to be specified.

Through descriptions of the foregoing embodiments, it is easy for a person skilled in the art to understand that the exemplary embodiments described herein can be implemented by software or by combining software with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing this application disclosed herein, a person skilled in the art would easily conceive of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application. The scope of this application is limited by the appended claims only.

In conclusion, the scope of the claims shall not be limited to the implementations in the foregoing described examples, but instead the specification shall be considered as a whole and provided with the broadest interpretation.

What is claimed is:

1. An image processing method performed at a computing device having one or more processors and memory storing a plurality of computer programs to be executed by the one or more processors, the method comprising:
   obtaining a to-be-processed image with ghost reflection;
   calculating an image gradient of the to-be-processed image;
   determining, according to the image gradient, a gradient of a target image obtained after the ghost reflection is removed from the to-be-processed image; and
   generating the target image based on the gradient of the target image, including:
      constructing an optimization function according to the gradient of the target image, the to-be-processed image and a target variable;
      minimizing the optimization function to a minimum value to obtain a corresponding optimal solution of the target variable; and generating the target image based on the optimal solution of the target variable.

2. The image processing method according to claim 1, wherein the determining, according to the image gradient, a gradient of a target image obtained after the ghost reflection is removed from the to-be-processed image comprises:
calculating a gradient magnitude of each pixel in the to-be-processed image according to the image gradient;
determining a gradient value of each pixel in the target image based on the gradient magnitude of each pixel in the to-be-processed image; and
determining the gradient of the target image according to the gradient value of each pixel in the target image.

3. The image processing method according to claim 2, wherein the determining a gradient value of each pixel in the target image based on the gradient magnitude of each pixel in the to-be-processed image comprises:
determining, in the to-be-processed image, a first-type pixel of which the gradient magnitude is less than a magnitude threshold and a second-type pixel of which the gradient magnitude is greater than or equal to the magnitude threshold;
setting a gradient value of the first-type pixel to 0, to obtain an updated gradient value of the first-type pixel; and
using the updated gradient value of the first-type pixel and a gradient value of the second-type pixel as the gradient value of each pixel in the target image.

4. The image processing method according to claim 3, further comprising:
determining the magnitude threshold by using a preset calculation method according to the gradient magnitude of each pixel in the to-be-processed image.

5. The image processing method according to claim 3, further comprising:
generating an initial target image by using a preset initial value of the magnitude threshold, and displaying the initial target image in a user interface;
providing a threshold input interface in the user interface, and determining an updated value of the magnitude threshold according to an operation of a user on the threshold input interface; and
generating an updated target image by using the updated value of the magnitude threshold, and displaying the updated target image in the user interface.

6. The image processing method according to claim 1, wherein the generating the target image based on the gradient of the target image comprises:
determining a gradient matrix of the to-be-processed image;
determining a first element corresponding to the ghost reflection in the to-be-processed image according to values of elements in the gradient matrix, presetting the gradient matrix by using the first element, and using a processed gradient matrix as a gradient matrix of the target image; and
restoring the target image by using the gradient matrix of the target image and the to-be-processed image.

7. The image processing method according to claim 6, wherein the restoring the target image by using the gradient matrix of the target image and the to-be-processed image comprises:
determining a Laplace transform result for a divergence of the gradient matrix of the target image; and
restoring the target image by using the Laplace transform result and the to-be-processed image.

8. The image processing method according to claim 7, wherein the restoring the target image by using the Laplace transform result and the to-be-processed image comprises:
determining a weighted sum of the Laplace transform result and the to-be-processed image;
determining a discrete cosine transform result of the weighted sum; and
performing an inverse discrete cosine transform on a quotient of the discrete cosine transform result and a position characteristic quantity of each pixel, and using the value of the inverse transform as a pixel value of each pixel.

9. The image processing method according to claim 1, wherein the calculating an image gradient of the to-be-processed image, determining, according to the image gradient, a gradient of a target image obtained after the ghost reflection is removed from the to-be-processed image, and generating the target image based on the gradient of the target image comprises:
calculating an image gradient corresponding to each color channel of the to-be-processed image;
determining a gradient corresponding to each color channel of the target image according to the image gradient corresponding to each color channel;
generating a monochromatic image corresponding to each color channel based on the gradient corresponding to each color channel of the target image; and
synthesizing the target image by using the monochromatic image corresponding to each color channel.

10. The image processing method according to claim 1, wherein the constructing an optimization function according to the gradient of the target image, the to-be-processed image and a target variable comprises:
calculating a divergence of the gradient of the target image, constructing a first calculated item according to the divergence of the gradient of the target image and a Laplace transform item of the target variable, and constructing a second calculated item according to the to-be-processed image and the target variable; and
generating the optimization function according to the first calculated item and the second calculated item.

11. The image processing method according to claim 10, wherein the generating the optimization function according to the first calculated item and the second calculated item comprises:
generating a weight of the first calculated item and a weight of the second calculated item, the weight of the second calculated item being less than the weight of the first calculated item; and
performing weighted summation on the first calculated item and the second calculated item according to the weight of the first calculated item and the weight of the second calculated item, to generate the optimization function.

12. The image processing method according to claim 11, wherein the optimization function is generated according to the following formula:

$$k_1\|\mathcal{L}(T)-\text{div}(\delta_h(\nabla I))\|_2^2+k_2\|T-I\|_2^2, \text{ wherein}$$

$\mathcal{L}(T)$ represents the Laplace transform item of the target variable; $\delta_h(\nabla I)$ represents the gradient of the target image; $\text{div}(\cdot)$ represents a divergence operator; T represents the target variable; I represents the to-be-processed image; $k_1$ represents the weight of the first calculated item; and $k_2$ represents the weight of the second calculated item.

13. The image processing method according to claim 1, wherein generating the target image based on the gradient of the target image further comprises:
- performing a derivation operation on the target variable in the optimization function, to obtain a derivative of the optimization function;
- setting a value of the derivative to 0, to construct an objective equation; and
- solving the objective equation, to obtain the optimal solution corresponding to the objective variable.

14. The image processing method according to claim 13, wherein the solving the objective equation comprises:
- performing a discrete cosine transform on the target equation; and
- obtaining the optimal solution corresponding to the target variable based on a discrete cosine transform result of the target equation.

15. The image processing method according to claim 1, wherein the generating the target image based on the optimal solution of the target variable comprises:
- calculating a pixel value of each pixel in the target image based on the optimal solution of the target variable; and
- generating the target image according to the pixel value of each pixel in the target image.

16. The image processing method according to claim 15, wherein the calculating a pixel value of each pixel in the target image based on the optimal solution of the target variable comprises:
- separately calculating a color value of each color channel corresponding to each pixel in the target image based on the optimal solution of the target variable; and
- determining the pixel value of each pixel in the target image according to the color value of each color channel corresponding to each pixel in the target image.

17. A computing device comprising:
- one or more processors;
- memory; and
- a plurality of computer programs stored in the memory that, when executed by the one or more processors, cause the computing device to perform a plurality of operations including:
- obtaining a to-be-processed image with ghost reflection;
- calculating an image gradient of the to-be-processed image;
- determining, according to the image gradient, a gradient of a target image obtained after the ghost reflection is removed from the to-be-processed image; and
- generating the target image based on the gradient of the target image, including:
  - constructing an optimization function according to the gradient of the target image, the to-be-processed image and a target variable;
  - minimizing the optimization function to a minimum value to obtain a corresponding optimal solution of the target variable; and
  - generating the target image based on the optimal solution of the target variable.

18. The computing device according to claim 17, wherein the determining, according to the image gradient, a gradient of a target image obtained after the ghost reflection is removed from the to-be-processed image comprises:
- calculating a gradient magnitude of each pixel in the to-be-processed image according to the image gradient;
- determining a gradient value of each pixel in the target image based on the gradient magnitude of each pixel in the to-be-processed image; and
- determining the gradient of the target image according to the gradient value of each pixel in the target image.

19. A non-transitory computer readable storage medium, storing computer executable instructions, and the computer executable instructions, when executed by a computing device having one or more processors, cause the computing device to perform a plurality of operations including:
- obtaining a to-be-processed image with ghost reflection;
- calculating an image gradient of the to-be-processed image;
- determining, according to the image gradient, a gradient of a target image obtained after the ghost reflection is removed from the to-be-processed image; and
- generating the target image based on the gradient of the target image, including:
  - constructing an optimization function according to the gradient of the target image, the to-be-processed image and a target variable;
  - minimizing the optimization function to a minimum value to obtain a corresponding optimal solution of the target variable; and
  - generating the target image based on the optimal solution of the target variable.

20. The non-transitory computer readable storage medium of claim 19, wherein the determining, according to the image gradient, a gradient of a target image obtained after the ghost reflection is removed from the to-be-processed image comprises:
- calculating a gradient magnitude of each pixel in the to-be-processed image according to the image gradient;
- determining a gradient value of each pixel in the target image based on the gradient magnitude of each pixel in the to-be-processed image; and
- determining the gradient of the target image according to the gradient value of each pixel in the target image.

* * * * *